United States Patent
Huang et al.

[11] Patent Number: 5,873,995
[45] Date of Patent: Feb. 23, 1999

[54] END-OF-LIFE INDICATOR FOR WATER TREATMENT DEVICE

[75] Inventors: Alexander Huang, Menlo Park; Richard Fayram, Palo Alto; John Stiggelbout, Sausalito, all of Calif.

[73] Assignee: The Clorox Company, Oakland, Calif.

[21] Appl. No.: 851,774

[22] Filed: May 6, 1997

[51] Int. Cl.⁶ .......................... B01D 17/12; B01D 35/143; G01D 13/00
[52] U.S. Cl. .............................. 210/87; 210/120; 210/472; 210/475; 222/36; 116/284
[58] Field of Search ................................. 210/85, 87–89, 210/100, 120, 282, 464, 466, 469, 472–477, 436, 37; 222/36, 38; 116/284, 285, 288, 298

[56] References Cited

U.S. PATENT DOCUMENTS

| | | |
|---|---|---|
| 71,865 | 12/1867 | Fitzgerald .................................. 222/38 |
| 165,054 | 6/1875 | Baldwin ..................................... 222/36 |
| 2,669,707 | 2/1954 | Ehrman . |
| 3,738,310 | 6/1973 | Rosaen et al. . |
| 4,053,405 | 10/1977 | DeKeyser et al. . |
| 4,202,467 | 5/1980 | Rutten et al. . |
| 4,384,474 | 5/1983 | Kowalski . |
| 4,681,677 | 7/1987 | Kuh et al. ................................. 210/100 |
| 4,686,037 | 8/1987 | Lang ......................................... 210/282 |
| 4,698,164 | 10/1987 | Ellis . |
| 4,895,648 | 1/1990 | Hankammer . |
| 4,918,426 | 4/1990 | Butts et al. ................................. 210/89 |
| 4,986,901 | 1/1991 | Nohren . |
| 5,089,144 | 2/1992 | Ozkahyaoglu et al. ................... 210/87 |
| 5,139,666 | 8/1992 | Charbonneau . |
| 5,190,643 | 3/1993 | Duncan . |
| 5,527,451 | 6/1996 | Hembree . |
| 5,536,394 | 7/1996 | Lund . |
| 5,665,224 | 9/1997 | Levene et al. ........................... 210/472 |

FOREIGN PATENT DOCUMENTS 3434533  12/1985  Germany .

*Primary Examiner*—Joseph W. Drodge
*Attorney, Agent, or Firm*—Francis Law Group

[57] ABSTRACT

An end-of-life indicator comprising a housing having a chamber therein and attachable to the water treatment device, a diaphragm disposed within the chamber, a rotatable cap having indicia disposed thereon adapted to cooperate with the housing, a spring device for rotating the cap with respect to the housing, an escapement device for regulating the rotational displacement of the cap and means for resetting the cap to a start position. The chamber is arranged for the ingress of water into the water treatment device to pressurize the chamber and the egress of water from the water treatment device to depressurize the chamber, the ingress and egress of water defining one fill cycle. The diaphragm is arranged to be moved by the pressurizing and depressurizing of the chamber. The escapement device are arranged to cooperate with the diaphragm and the spring device whereby predetermined incremental rotation of the cap is provided during each of the fill cycles.

23 Claims, 7 Drawing Sheets

5,873,995

END-OF-LIFE INDICATOR FOR WATER TREATMENT DEVICE

FIELD OF THE PRESENT INVENTION

The present invention relates generally to water treatment devices. More particularly, the invention relates to a mechanism for indicating the end of useful life of a water treatment device.

BACKGROUND OF THE INVENTION

Water treatment devices are well known in the art. Such devices are employed directly in a water system, either in-line or at a terminal end, or in self-contained batch systems. An example of an in-line system is an under the counter device which filters water prior to reaching the faucet. Terminal end devices include counter top and faucet mounted filtration systems. Self-contained batch systems include devices such as carafe units.

Typical water treatment devices employ mechanical filtration or chemical treatment. Mechanical filters treat water by preventing passage of particulates. As a mechanical filter approaches the end of its useful life, restricted flow due to particulate accumulation provides a ready indication that element replacement is necessary.

Chemical treatment (e.g., activated carbon-based and ion exchange media) employs processes such as adsorption and ion exchange for removing undesirable chemical species. A major drawback associated with chemical treatment is that the chemical media eventually becomes inactive, providing no such indication that the useful life of the chemical element has been exceeded.

As a result, various methods have been employed to indicate end of life to the user where it is not inherently provided by the behavior of the filter media. Illustrative is the method disclosed in U.S. Pat. No. 4,686,037. In the noted method, the user compares the color of the pre-filter with a reference strip to determine when the media requires replacement. The problem with this method, however, is that it is inherently subjective and, therefore, subject to error.

A more accurate means of indicating end of useful life of conventional treatment units is through devices which use a process commonly referred to as "flow totalization". These devices totalize the liquid volume which is passed through the treatment media.

Both electrical and mechanical "flow totalization" devices are known in the art. Illustrative are the devices disclosed in U.S. Pat. Nos. 4,918,426; 5,089,144; 4,681,677; and 5,536,394.

In U.S. Pat. Nos. 4,918,426 and 5,089,144 electrical flow totalization devices are disclosed which employ pressure transducers. The transducers include integrated outputs to calculate total volume. After a predetermined volume has been reached, a valve is electrically actuated to stop flow.

U.S. Pat. No. 4,681,677 discloses a mechanical flow totalization device which employs a turbine interconnected with a series of gears. The gears are designed and adapted to mechanically "add up" the volume of water passed through the device. The gears also cooperate with a valve that is adapted to stop flow after a predetermined volume of water has passed through the device.

In U.S. Pat. No. 5,536,394 a mechanical flow totalization device is disclosed which employs a float mechanism. The float is designed and adapted to rotate a pre-determined distance upon each fill cycle of the water treatment unit. Once the float has made a specific number of rotations and has traveled a complete distance across a support rod, the float rests in a position where it visible through an opening in a housing, indicative of the end of life of the water treatment unit.

Although flow totalization devices address the end of life problem(s), there are drawbacks. One major drawback is that flow totalization devices are often complex and, hence, expensive. Another drawback is that such devices can, and in many instances will, adversely effect the flow thru characteristics of the water treatment device (i.e. filter cartridge).

An additional drawback with mechanical flow totalization devices is that the devices are typically incorporated into the replaceable cartridge. This approach is unnecessarily wasteful and expensive.

It is therefore an object of the present invention to provide a device for indicating the end of useful life of a water treatment system that is mechanically simple, accurate and reliable.

It is another object of the invention to provide a device for indicating the end of useful life of a water treatment system which can be readily reset upon replacement of the cartridge and/or chemical media.

It is another object of the invention to provide a device for indicating the end of useful life which enhances the flow thru characteristics of the filter cartridge.

It is yet another object of the invention to provide a device for indicating the end of useful life which is readily adaptable to various batch water treatment systems.

These and other objects of the present invention will be apparent to those skilled in the art from the following detailed description of the invention and the accompanying drawings.

SUMMARY OF THE INVENTION

In accordance with the above objects and those that will be mentioned and will become apparent below, the end-of-life indicator in accordance with this invention comprises a housing having a chamber therein. The housing includes means for mounting the housing to the water treatment device. In a preferred embodiment of the invention, the chamber is in fluid communication with the water treatment device when the housing is attached thereto.

The chamber is arranged for the ingress of water into the water treatment device to pressurize the chamber and the egress of water out of the water treatment device to depressurize the chamber. The ingress and egress of water defines one fill cycle.

The indicator also includes a diaphragm disposed within the chamber, a rotatable cap adapted to cooperate with the housing, spring means for rotating the cap with respect to the housing and means for resetting the cap to a start position. The cap includes indicia means disposed thereon. The diaphragm is arranged to be moved by the pressurizing and depressurizing of the chamber.

The end-of-life indicator further includes escapement means for regulating the rotational displacement of the cap. The escapement means are arranged to cooperate with the diaphragm and the spring means whereby predetermined incremental rotation of the cap is provided during each of the fill cycles.

In a preferred embodiment of the invention, the indicator includes an indicator bar. The indicator bar is adapted to cooperate with the rotatable cap to provide a visual indication of the rotational displacement of the cap.

In an additional embodiment of the invention, the indicator also includes ventilation means. The ventilation means are arranged to cooperate with the water treatment device to improve the flow thru characteristics thereof.

The present invention is particularly advantageous because it is accurate, mechanically simple and reliable, readily reset upon replacement of the cartridge and/or chemical media and readily adaptable to various batch water treatment systems.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE PREFERRED EMBODIMENT

The end-of-life mechanism of the present invention substantially reduces or eliminates the disadvantages and shortcomings associated with prior art devices and/or methods. As discussed in detail below, the end-of-life mechanism of the present invention is (i) mechanically simple, accurate and reliable, (ii) readily reset upon replacement of the cartridge and/or chemical media, and (iii) readily adaptable to various batch water treatment systems, and (iv) enhances the flow thru characteristics of the cartridge.

Figure 1:
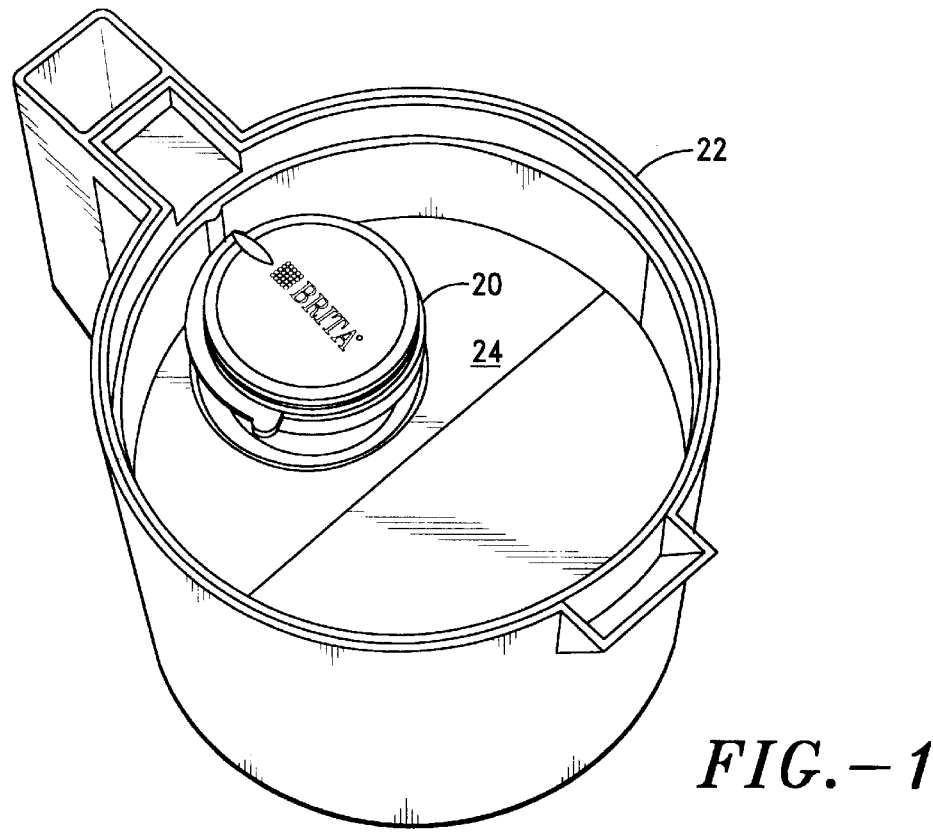
FIG. 1 is a perspective view of an embodiment of the end-of-life indicator in use with a carafe according to the invention.
Figure 6:
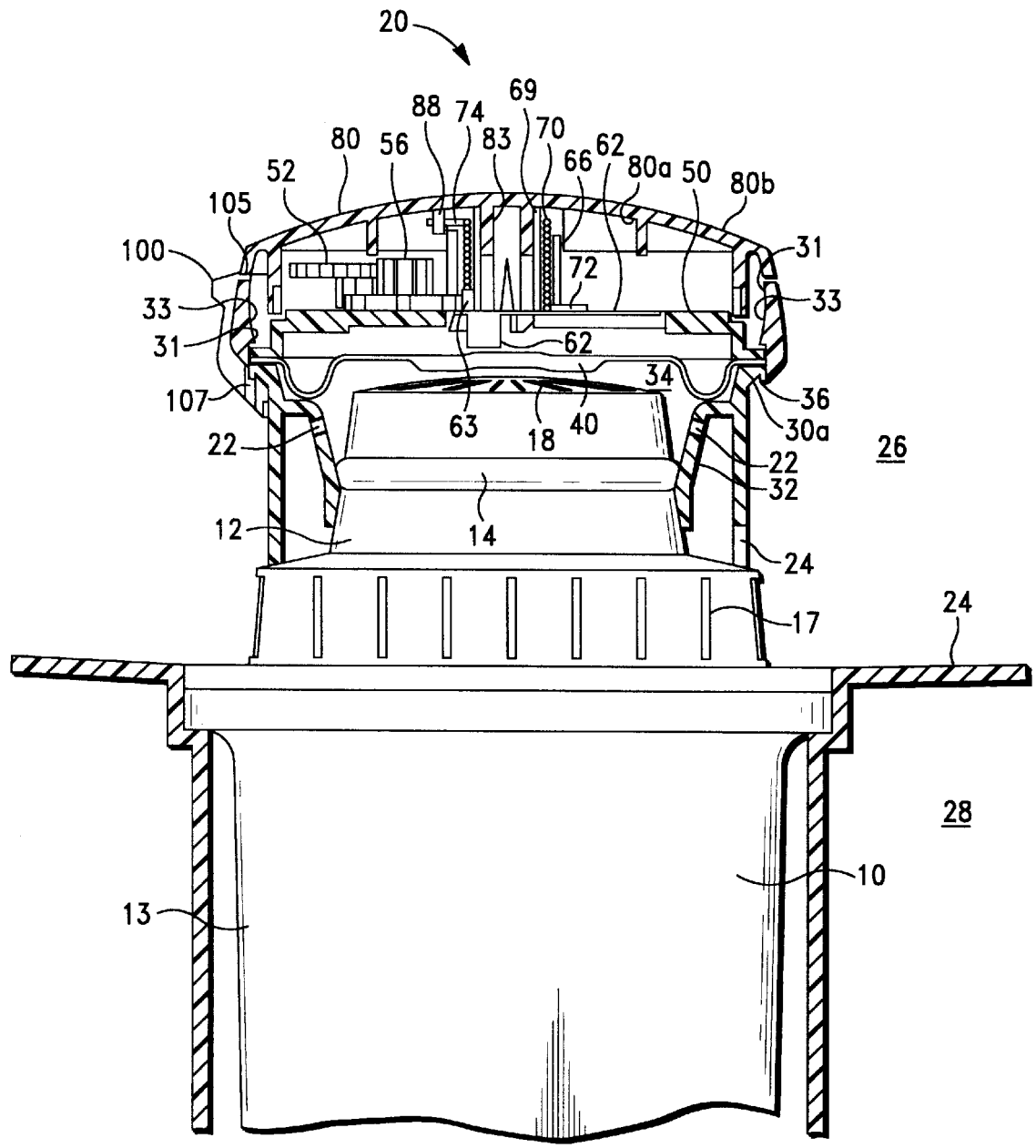
FIG. 6 is a side cross-sectional view of the end-of-life indicator according to the invention illustrating the steady state position of the diaphragm.
Figure 7:
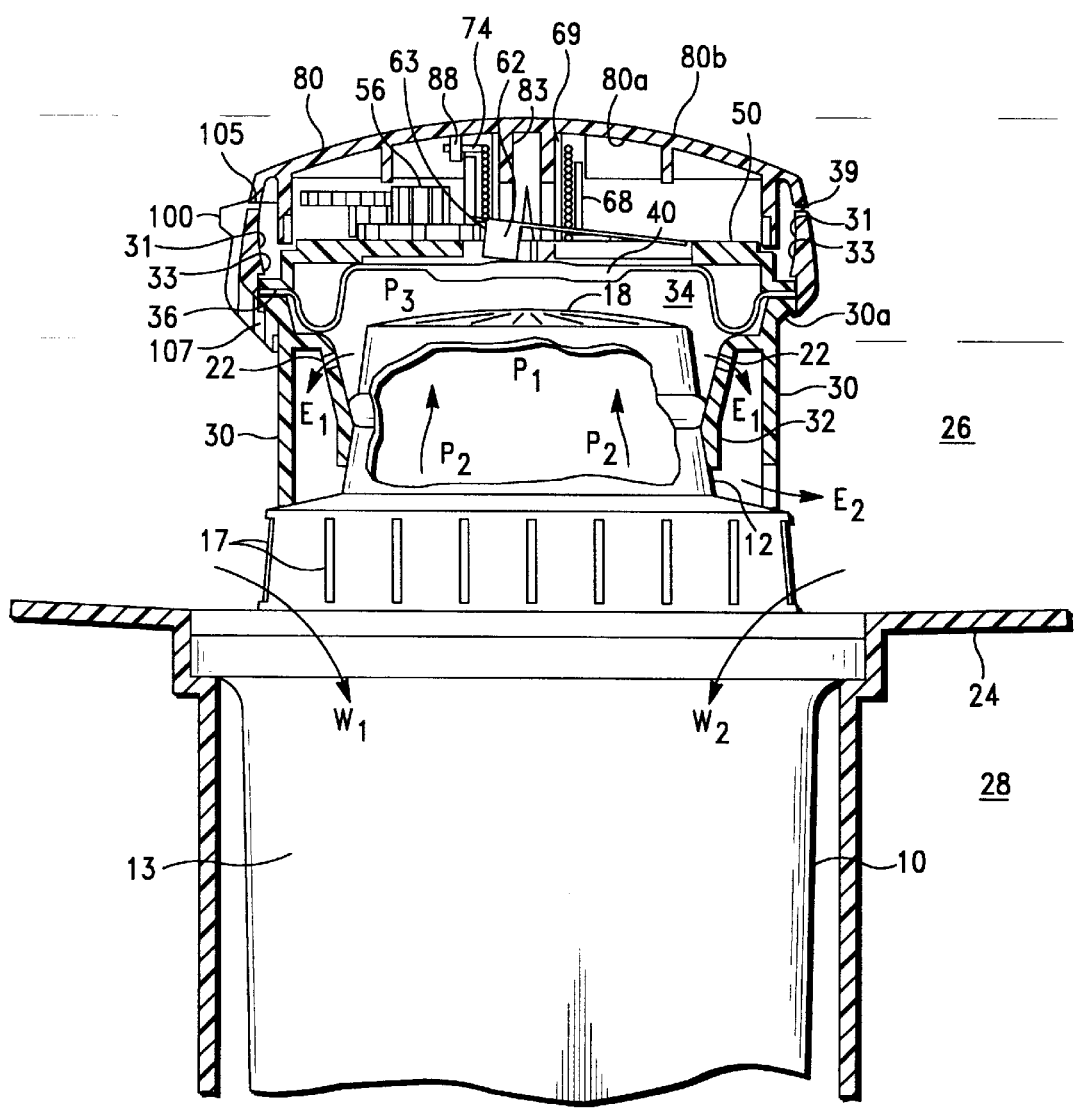
FIG. 7 is a side cross-sectional view of the end-of-life indicator according to the invention illustrating the deflection of the diaphragm during a fill cycle.

Referring first to FIG. 1, there is shown the end-of-life indicator 20 of the present invention operatively positioned in a gravity feed, water filtration carafe 22. As illustrated in FIGS. 6 and 7, the filter cartridge 10 is sealably mounted in the wall 24 disposed between the top 26 and bottom 28 reservoirs of the carafe 22.

Figure 2:
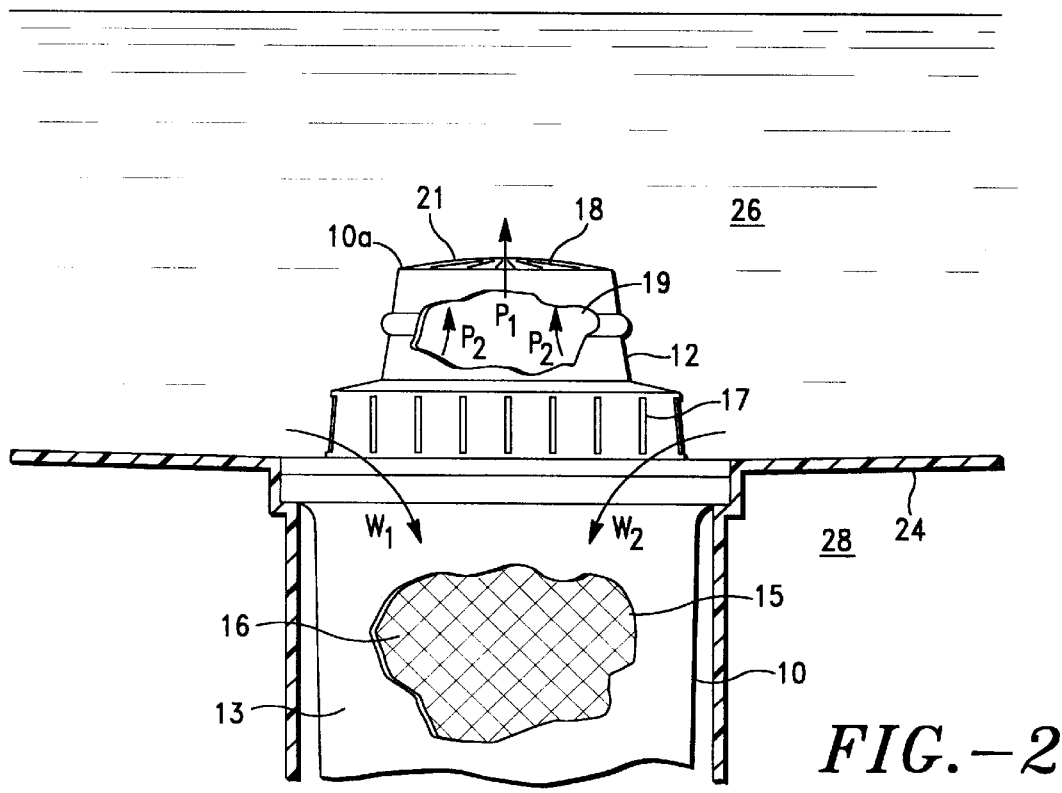
FIG. 2 is a side cross-sectional view of a conventional water treatment device.

Referring to FIG. 2, the filter cartridge 10 includes a housing 13 having a chamber 15 disposed therein. Disposed within the cartridge chamber 15 is a chemical element 16 (e.g. activated carbon-based media) to effectuate the chemical treatment of the water.

Figure 3:
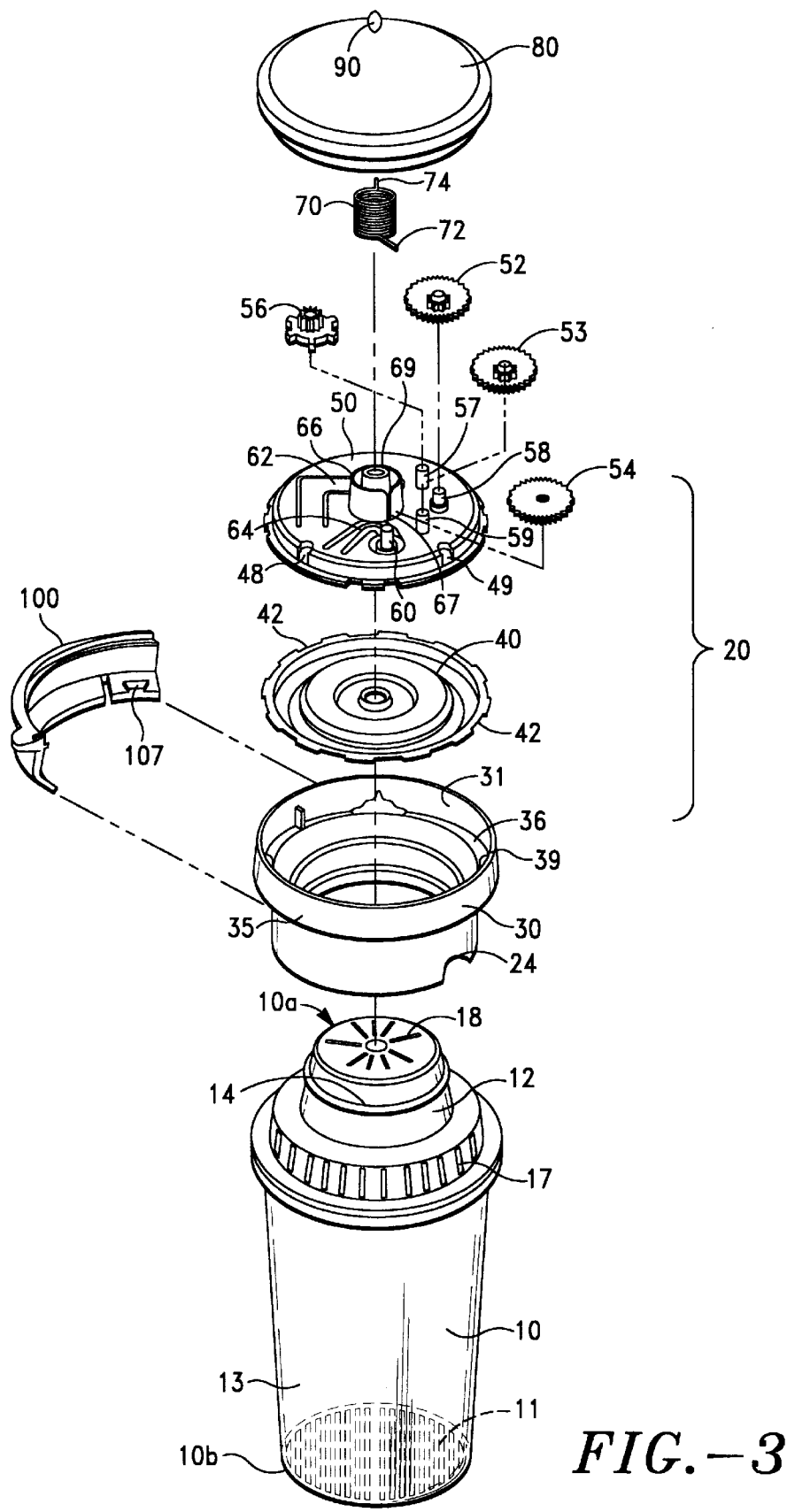
FIG. 3 is an exploded view of the end-of-life indicator according to the invention.

The housing 13 further includes a plurality of water inlet slits 17, ventilation slits 18 and water outlet slits 11. The inlet slits 17 are disposed at the top 10a of the cartridge 10 and are arranged to allow the ingress of water into the cartridge chamber 15 as denoted by Arrows $W_1$ and $W_2$. The ventilation slits 18 are also disposed on the top 10a of the cartridge 10 and are arranged to facilitate the release of air from the chamber 15, as denoted by Arrow R. Referring to FIG. 3, the outlet slits 11 are disposed on the bottom 10b of the cartridge 10 and are arranged to allow the egress of water out of the cartridge chamber 15.

As will be appreciated by one having ordinary skill in the art, during submergence of the cartridge 10 (i.e. filling of reservoir 26) air is trapped in the top portion 19 of the chamber 15 and exhibits pressure $P_1$. During ingress of water into the cartridge chamber 15, the air pressure $P_1$ is further increased by virtue of the displaced air in the chamber 15 as denoted by Arrows $P_2$. This trapped (pressurized) air can, and in many instances will, adversely effect the flow thru characteristics (e.g. flow rate, path, consistency) of the cartridge 10.

Thus, to achieve optimum flow thru characteristics of the cartridge 10, the trapped air in the cartridge chamber 15 must be effectively (and efficiently) discharged or released out of the chamber 15. As stated, this is typically achieved by virtue of the ventilation slits 18 disposed on the top 10a of the cartridge 10.

There is, however, one problem associated with this methodology. To effectively discharge air from the chamber 15, the air pressure $P_1$ must have sufficient magnitude to overcome the surface tension of the water at the air-water interface 21 proximate the narrow ventilation slits 18. However, the ventilation slits 18 (and inlet slits 17) must be narrow enough to contain the chemical media 16 (e.g. activated carbon fines) within the chamber 15 during the ingress and egress of water. As a result of the competing function of the slits 18, optimum flow thru characteristics of the cartridge 10 are difficult, and in some instances impossible, to achieve.

As discussed in detail herein, Applicants have overcome the noted ventilation problem by incorporating a unique ventilation means into the indicator 20. The ventilation means are arranged and adapted to cooperate with the ventilation slits 18 of the cartridge 10 to achieve optimum flow thru rates, path and consistency.

Referring now to FIGS. 6 and 7, the indicator 20 is preferably removably mounted to the top portion 12 of the filter cartridge 10 whereby the indicator housing chamber 34 (discussed below) is in fluid communication with the cartridge chamber 15. In a preferred embodiment of the invention, the indicator 20 includes a peripheral engagement member 32 cooperatingly shaped in accordance with the retaining rib 14 disposed on the top portion 12 of the filter cartridge 10.

The indicator 20 is thus restrained from moving or floating when the reservoir 26 is filled or when water is poured from the carafe 22. The indicator 20 may also be readily removed and reattached to a replacement filter cartridge 10.

In a further embodiment of the invention, not shown, the indicator 20 is operatively mounted in the top reservoir 26 of the carafe 22. As will be appreciated by one having ordinary skill in the art, the indicator 20 can be mounted in the reservoir 26 by various conventional means.

Referring now to FIG. 3, there is shown an exploded view of one embodiment of the present invention. As illustrated, the indicator 20 preferably includes a housing 30, a diaphragm 40, a gear plate 50, a plurality of reduction gears 52, 53, 54, an escapement gear 56, an escapement arm 62, a torsion spring 70 and a cap 80.

According to the invention, the housing 30 includes a chamber 34 disposed therein (see FIGS. 6 and 7). As stated, the housing chamber 34 preferably is in fluid communication with the cartridge chamber 15 when the indicator 20 is operatively connected to the cartridge 10.

Referring to FIGS. 6 and 7, the housing 30 further includes a plurality of ventilation ports 22 and an exit vent 24. As discussed below, the ventilation ports 22 serve to equalize the air pressure within the chamber 34 and facilitate the release of air through the exit vent 24.

As will be appreciated by one having ordinary skill in the art, the exit vent 24 may comprise various shapes (or more than one outlet). Applicants have, however, found that optimum air bubble release and, hence, venting is achieved with a vent 24 cross-sectional area of 0.025 sq. in. or greater.

Referring now to FIG. 7, there is shown a graphic illustration of the unique ventilation means of the invention. As discussed, when reservoir 26 is filled with water, air is trapped in the upper portion of the cartridge 10, producing pressure $P_1$. As water enters the cartridge chamber 15, the air pressure increases as denoted by Arrows $P_2$. However, by providing an air-to-air interface proximate the ventilation slits 18 and, thus, eliminating the flow restriction caused by the liquid surface tension across slits 18, the trapped air is readily released into the indicator chamber 34, producing pressure $P_3$ therein.

According to the invention, the indicator ventilation ports 22 serve to equalize the pressure $P_3$ within chamber 34. The ports 22 further facilitate the release of air from the chamber 34 into and through the exit vent 24, as denoted by Arrows $E_1$ and $E_2$.

Ventilation slits 18, ventilation ports 22 and exit vent 24 thus provide a low restriction air path for the cartridge 10. As a result, the flow thru characteristics of the cartridge are significantly enhanced. Indeed, Applicants have specifically found that improvements in the water flow rate can be achieved by virtue of the noted ventilation means 18, 22, 24 and the unique synergism thereof.

Referring now to FIG. 3, the indicator housing 30 further includes an annular seat 36 disposed in the housing chamber 34. As discussed in detail below, the seat 36 is designed and adapted to receive and position the diaphragm 40 and gear plate 50.

As will be appreciated by one having ordinary skill in the art, the housing 30 can be fabricated out of various rigid plastic materials such as styrene and acrylonitrile butadiene styrene (ABS). In a preferred embodiment, the housing 30 is fabricated out of styrene.

A key component of the invention is the diaphragm 40. The diaphragm 40, in conjunction with the escapement means of the invention, provides accurate and reliable regulation of the rotational displacement of the cap 80 and indicia means disposed thereon.

The diaphragm 40 preferably comprises a substantially cylindrical disc. In a preferred embodiment, the diaphragm 40 is cooperatingly shaped in accordance with the housing seat 36 and includes a plurality of drainage recesses 42 disposed on the outer edge thereof. As discussed in detail below, the recesses 42 are designed and adapted to cooperate with drainage holes 49 to facilitate drainage of water (above the diaphragm 40) from the indicator housing 30 (see FIG. 4).

As will be appreciated by one having ordinary skill in the art, the diaphragm 40 can be cast or molded out of various conventional elastomeric materials. In a preferred embodiment, the diaphragm is fabricated out of a thermoplastic polyurethane.

As illustrated in FIG. 3, the indicator gear plate 50 is similarly cooperatingly shaped in accordance with the housing seat 36. A plurality of retaining tabs 33 are preferably provided on the inner wall 31 of the housing 30 proximate the housing seat 36 to engage and secure the plate 50 to the housing 30 (see FIGS. 6 and 7). According to the invention, when the plate 50 and diaphragm are positioned on the housing seat 36, the plate 50 sealingly secures the diaphragm 40 in the housing chamber 34.

The indicator 20 further includes a spring 70 to effectuate the noted rotational displacement of the cap 80. As will be appreciated by one having ordinary skill in the art, various springs may be employed to provide a rotational force to the cap 80. In a preferred embodiment, the spring 70 comprises a conventional torsion spring with top 74 and bottom 72 radially extending tails.

As illustrated in FIG. 3, the gear plate 50 includes gear axles 57, 58, 59, 60, escapement arm 62, idler flex arm 64, spring retainer 66 and cap retainer 69. According to the invention, axles 57, 58, 59 are adapted to rotatably position the escapement gear 56 and reduction gears 52, 53, respectively.

Axle 60 is similarly adapted to rotatably position the clutch idler gear 54 thereon. Axle 60 is operatively connected to the idler flex arm 64. As discussed in detail herein, the idler flex arm 64 forms a cantilever spring element which allows the clutch idler gear 54 to disengage the cap ring gear 82 from gears 52, 53, 56 upon resetting of the cap 80.

The gear plate spring retainer 66 is adapted to position the spring 70. The spring retainer 66 is provided with a spring slot 67 adapted to receive the lower spring tail 72 and, hence, rotationally constrain the lower portion of the spring 70 during resetting of the cap 80 (see FIG. 5).

The gear plate 50 is further provided with ventilation 48 and drainage 49 holes disposed proximate the outer edge thereof. According to the invention, the holes 48, 49 serve two functions: (i) to facilitate the release of trapped air above the diaphragm to allow it to move more freely and (ii) to facilitate the drainage of trapped water.

The gear plate 50 is similarly fabricated out of ABS or the like. The thickness of the plate 50 must, however, be sufficient enough to maintain the structural integrity of the plate 50.

Referring now to FIGS. 6 and 7, the indicator cap 80 includes an inwardly projecting retaining boss 83 adapted to slideably engage the cap retainer 69 disposed on the gear plate 50. According to the invention, the retaining boss 83 is disposed on the bottom surface 80a of the cap 80 substantially coincident with the neutral axis thereof. The retaining boss 83 and cap retainer 69 thus facilitate rapid assembly of the indicator 20 and eliminate the need for additional fasteners.

Figure 5:
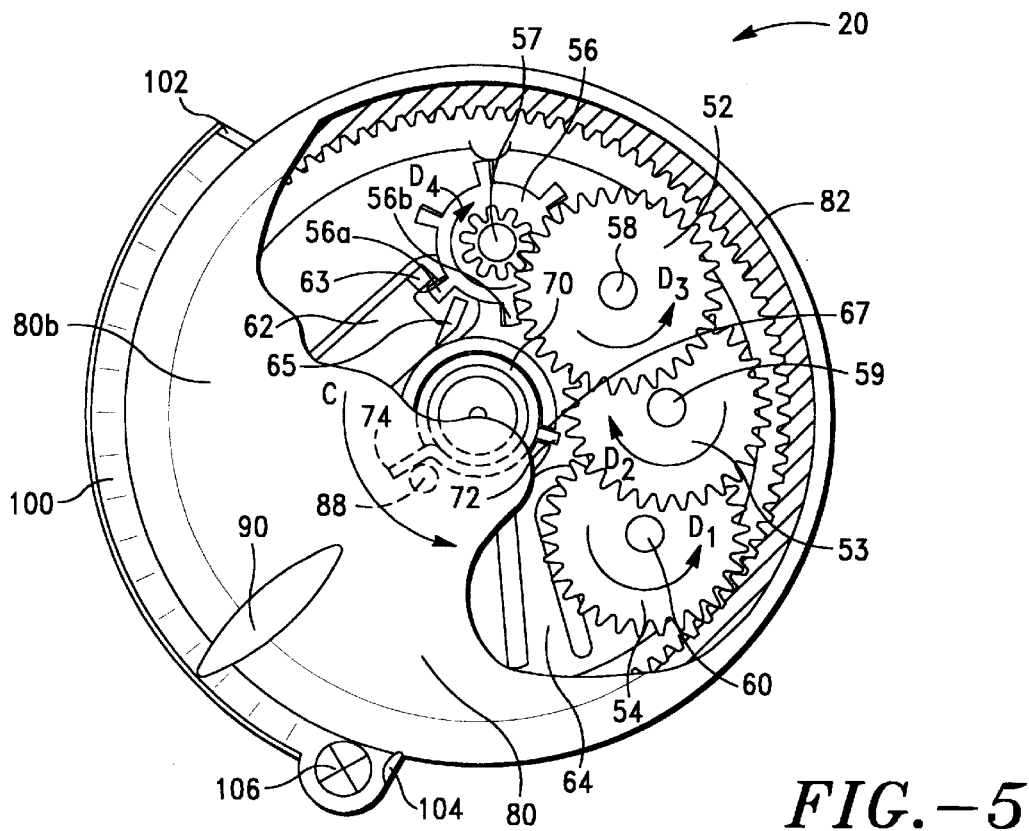
FIG. 5 is a top cross-sectional view of the end-of-life indicator according to the invention.

Also disposed on the bottom surface 80a of the cap 80 is an inwardly projecting spring seat 88 (see FIG. 5). As discussed in detail herein, the spring seat 88 is designed and positioned to cooperate with the top tail 74 of the spring 70 when the cap 80 is positioned on the indicator housing 30.

As will be appreciated by one having ordinary skill in the art, various spring seat designs s may be employed within the scope of the invention. The spring seat designs will however be dictated by the configuration and/or position of the spring tail(s) and the required preload.

Figure 4:
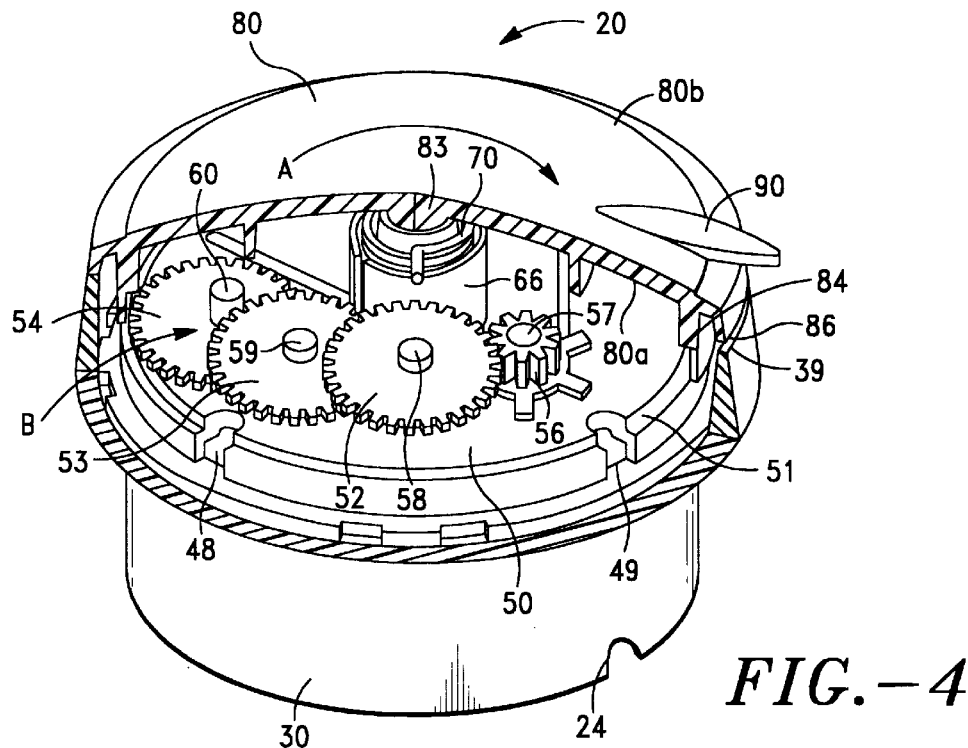
FIG. 4 is a perspective cross-sectional view of the end-of-life indicator according to the invention.

Disposed on the top surface 80b of the cap 80 is a pointer 90 which provides a visual indication of the position of the cap 80 (see FIG. 4). According to the invention, the pointer 90 can be a separate component attached to the top surface 80b of the cap 80 or formed integrally with the cap 80. In a preferred embodiment of the invention, the pointer 90 is integrally formed with the cap 80 and extends outwardly toward the outer edge of the cap 80.

According to the invention, the cap 80 can similarly be fabricated out of lightweight plastic, such as ABS or the like. In a preferred embodiment, the cap 80 is fabricated out of ABS.

Another key feature of the present invention is the interchangeable indicator bar or scale 100. The indicator bar 100 is adapted to cooperate with the cap pointer 90 to provide a visual indication of the rotational displacement of the cap 80 (see FIG. 5).

Figure 8:
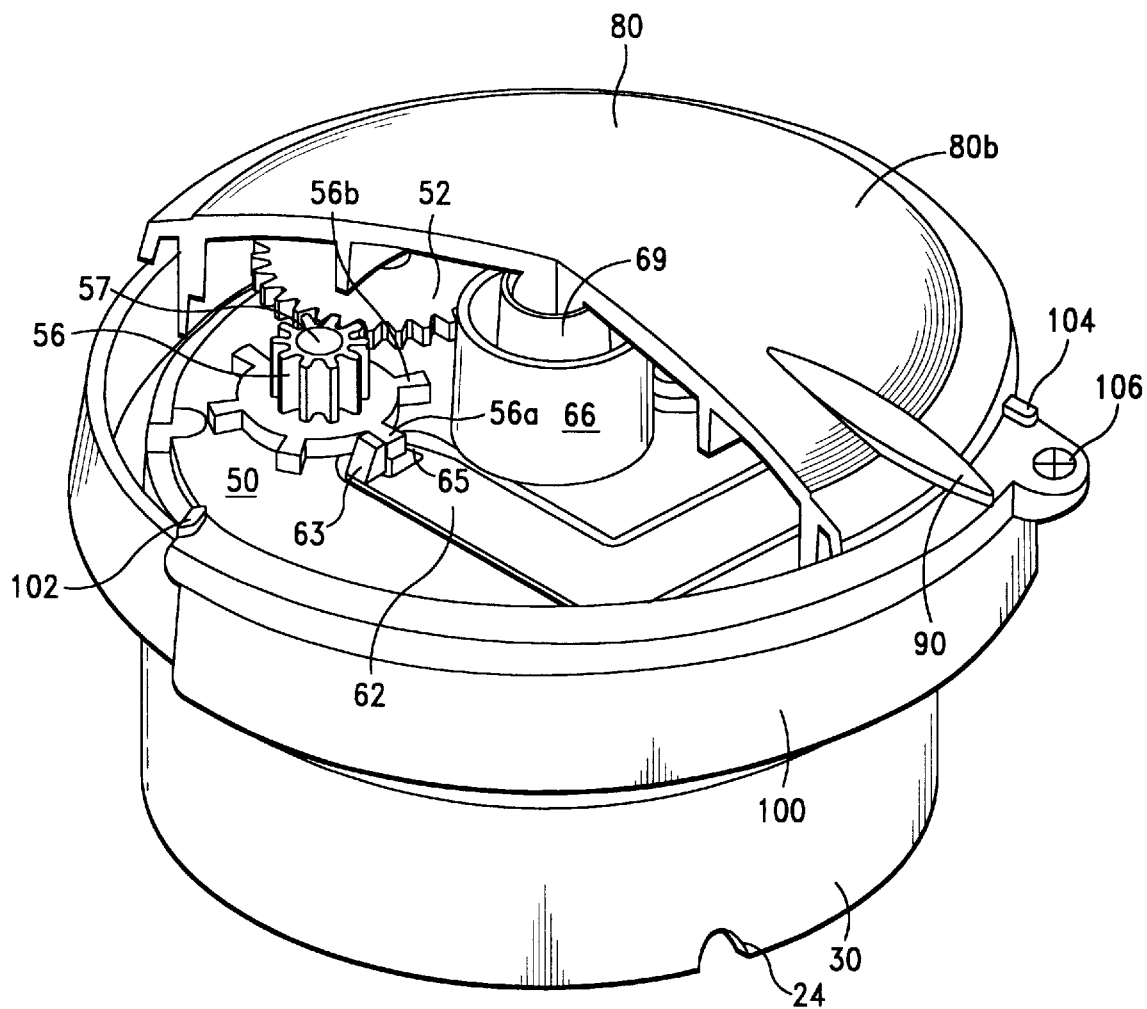
FIG. 8 is a perspective cross-sectional view of the end-of-life indicator according to the invention illustrating the steady state position of the escapement mechanism.

According to the invention, the indicator bar 100 is attached to the housing 30 on the upper portion 35 thereof. Referring to FIG. 8, the indicator bar 100 includes a reset tab 102, an end tab 104 and an end-of-life symbol 106. As discussed in detail below, the reset and end tabs 102, 104 are adapted to constrain and, hence, define the rotational displacement of the pointer 90.

As will be appreciated by one having ordinary skill in the art, the indicator bar 100 may include various indicia reflecting the number of fill cycles or useful life of the filter cartridge 10. For example, the indicator bar 100 may include numeric markings or a graduated color spectrum. The end-of-life symbol 106 may similarly comprise various markings such as a colored tab (e.g. red) or the letter "X" as illustrated in FIG. 5. In a preferred embodiment, the indicator bar 100 includes a contrasting color spectrum to provide a readily noticeable indication of the remaining useful life of the cartridge 10 to the user.

Figure 9:
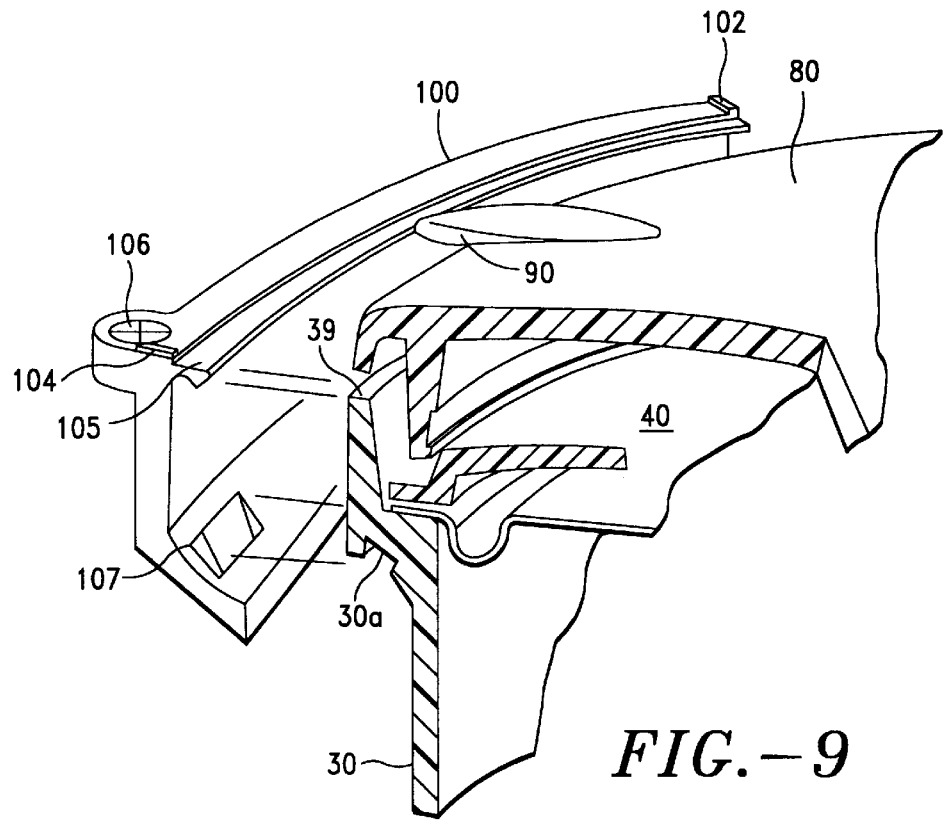
FIG. 9 is a partial cross-sectional view of the end-of-life indicator according to the invention illustrating the attachment means of the indicator bar.

As stated, the indicator bar 100 is attached to the housing 30 on the upward portion 35 thereof. In a preferred embodiment, the indicator bar 100 is removably attachable to the housing 30 by virtue of the inwardly extending bar flange 105 and indicator bar tabs 107. The indicator bar tabs 107 are adapted to removably engage the annular housing flange 30a (see FIG. 9). The bar flange 105 is adapted to slideably seat on the top edge 39 of the housing 30.

The indicator bar 100 may thus be readily exchanged for a different length indicator bar to accommodate for different carafe reservoir volumes. For example, a small carafe will require substantially more fill cycles to filter the same quantity of water. As a result, the range of rotational displacement of the pointer will also be substantially increased. Thus, a longer indicator gauge would be required to provide an accurate indication of the remaining useful life of the cartridge.

Operation

After a replacement cartridge 10 has been positioned in the carafe 22 with the indicator 20 operatively attached thereto, the cap 80 is reset (or rewound) by turning the cap 80 in a clockwise direction, as denoted by Arrow A (see FIG. 4). Clockwise rotation of the cap 80 relative to the housing 30 biases torsion spring 70 by virtue of the gear plate spring retainer 66 and the spring seat 88 disposed on the bottom 80a of the cap 80.

Clockwise rotation of the cap 80 further resets the pointer 90 on the indicator bar 100. As discussed above, indicator bar 100 is provided with reset stop 102 which limits the rotation of the pointer 90 during the resetting operation.

Clockwise rotation of the cap 80 during the resetting operation also causes idler clutch gear 54 (and associated axle 60) to disengage from reduction gear 53 (in the direction denoted by Arrow B) by virtue of the idler flex shaft 64. As discussed below, rotation of the escapement gear 56 and, hence, clutch idler gear 54 and reduction gears 52, 53 is precluded by escapement arm pawl 63.

According to the invention, after the cap 80 is reset, the torsion spring 70 applies a rotational force on the cap 80 in a counterclockwise direction denoted by Arrow C (see FIG. 5). The noted force, through cap ring gear 82, rotates reduction gears 54, 53, 52 and finally escapement gear 56 in the directions denoted by Arrows $D_1$–$D_4$. As discussed herein, regulation of the rotational displacement of the cap 80 is provided through the diaphragm 40, escapement arm 62 and escapement gear 56.

Referring now to FIG. 6, there is shown the indicator 20 and filter cartridge 10 positioned in an empty (i.e. reservoir dry) carafe 22. The diaphragm 40 is thus in its steady state condition proximate the escapement arm 62. The escapement arm 62 is similarly in its steady state or unflexed position. As illustrated in FIGS. 5 and 8, when the diaphragm 40 and escapement arm 62 are in the steady state positions, escapement arm pawl 63 restrains rotation of the escapement wheel 56 by interference with escapement gear tooth 56a.

Referring now to FIG. 7, there is shown the indicator 20 and filter cartridge 10 disposed in the carafe 22 with the reservoir 26 filled. As discussed, when the indicator 20 is submerged in the water, a pocket of air is trapped within the chamber 34 of the indictor housing 30, exhibiting pressure $P_3$. This pressure, $P_3$ is further increased by the air discharged through the ventilation slits 18 (denoted by Arrows $P_2$), causing the diaphragm 40 to deflect upward. The diaphragm 40 then contacts the escapement arm 62, deflecting the arm 62 upward.

Figure 10:
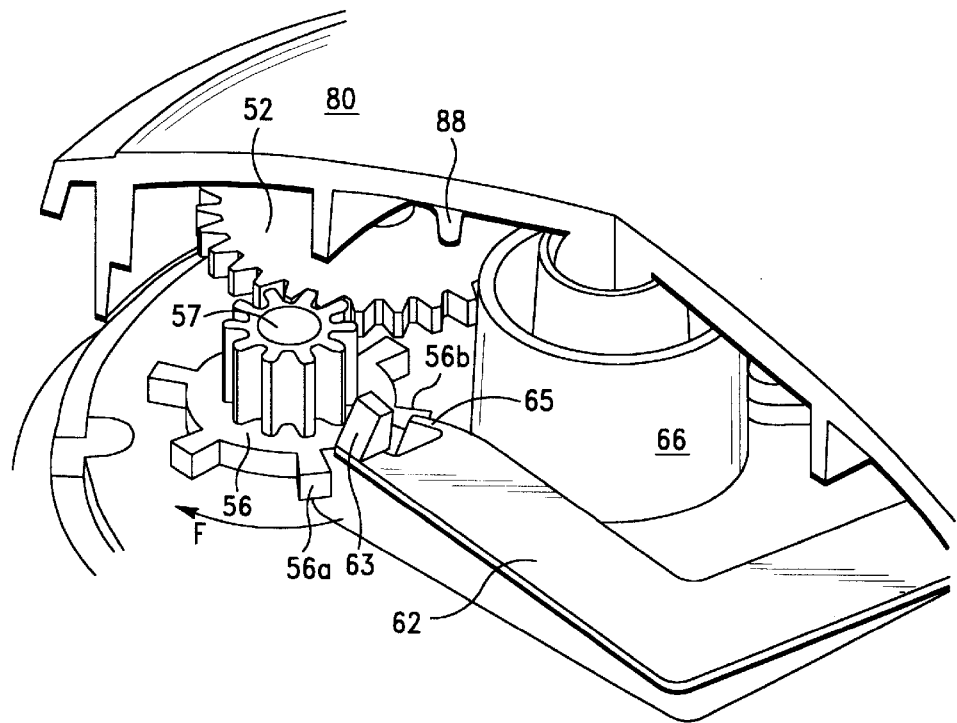
FIG. 10 is a partial perspective cross-sectional view of the end-of-life indicator according to the invention illustrating the deflection of the escapement mechanism during a fill cycle.

As illustrated in FIG. 10, when the escapement arm 62 is deflected upward, pawl 63 disengages from escapement gear tooth 56a, allowing tooth 56a to pass thereunder and escapement wheel 56 to rotate in the direction denoted by Arrow F. Continued rotation of the escapement wheel is, however, arrested by pawl 65 which engages successive escapement gear tooth 56b.

As the water level in the reservoir 26 drops and the water discharges out of the cartridge chamber 15, the indicator chamber 34 depressurizes (i.e. $P_3$ reduced) and, the diaphragm 40 and the escapement arm 62 return to their steady state positions. As the escapement arm 62 drops, pawl 65 drops below tooth 56b, allowing the escapement gear 56 to again advance until the next successive tooth contacts pawl 63.

SUMMARY

From the foregoing description, one of ordinary skill in the art can easily ascertain that the present invention provides a simple and reliable means for indicating the useful life of a filter cartridge and/or filter media. The indicator is also readily reset upon replacement of the cartridge and/or chemical media and adaptable to various batch water treatment systems.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. An end-of-life mechanism for a water treatment device, comprising:

a housing having a chamber therein, said housing including means for mounting said housing to the water treatment device whereby said chamber is in fluid communication with the water treatment device, said chamber being arranged for the ingress of water into the water treatment device to pressurize said chamber and the egress of water from the water treatment device to depressurize said chamber, said ingress of water into the water treatment device and egress of water out of the water treatment device defining one fill cycle;

a diaphragm disposed within said chamber, said diaphragm being arranged to be moved by said pressurizing and depressurizing of said chamber;

a cap having a top and bottom surface, said cap being rotatable mounted to said housing, said cap including indicia means for indicating cumulative fill cycles;

spring means for rotating said cap with respect to said housing;

escapement means for regulating the rotation of said cap, said escapement means being arranged to cooperate with said diaphragm and said spring means whereby predetermined incremental rotation of said cap is provided during each of said fill cycles; and means for resetting said cap to a start position, said resetting means including means for biasing said spring means.

2. The mechanism of claim 1, wherein said escapement means includes:

(a) an escapement arm adapted to cooperate with said diaphragm;

(b) a plurality of interconnected gears including a first gear and a last gear, said first gear arranged to cooperate with said rotatable cap; and (c) an escapement gear arranged to cooperate with said last gear and said escapement arm.

3. The mechanism of claim 2, wherein said escapement means includes means for releasing said interconnected gears and said escapement gear during resetting of said cap.

4. The mechanism of claim 3, wherein said gear releasing means includes a clutch idler gear and flex arm assembly.

5. The mechanism of claim 4, wherein said last gear comprises a clutch idler gear.

6. The mechanism of claim 1, wherein said spring means comprises a torsion spring.

7. The mechanism of claim 6, wherein said spring is arranged to engage said bottom surface of said cap.

8. The mechanism of claim 1, wherein said indicia means comprises a pointer.

9. The mechanism of claim 8, wherein said pointer is disposed on said top surface of said cap.

10. The mechanism of claim 1, wherein the mechanism includes an indicator bar, said indicator bar being adapted to cooperate with said indicia means to provide a visual indication of the cumulative fill cycles.

11. The mechanism of claim 10, wherein said housing includes means for removably securing said indicator bar.

12. The mechanism of claim 1, wherein said indicator includes ventilation means for venting air from the water treatment device.

13. An end-of life mechanism for a water treatment device, comprising:

a housing having a chamber therein attachable to the water treatment device, said chamber being arranged to be pressurized by the ingress of water into the water treatment device and depressurized by the egress of water from the water treatment device;

a diaphragm disposed within said chamber, said diaphragm being arranged to be moved by the pressurizing and depressurizing of said chamber;

a regulating member adapted to cooperate with said diaphragm;

a plurality of interconnecting gears, said gears including a first gear and a last gear;

an escapement gear arranged to cooperate with said last gear and said regulating member;

a rotatable cap adapted to cooperate with said first gear; and a spring attachable to said cap, said spring being arranged to provide mechanical rotation of said cap.

14. The mechanism of claim 13, wherein said chamber is in fluid communication with the water treatment device when said housing is attached to the water treatment device.

15. The mechanism of claim 13, wherein said cap includes a position indicator.

16. The mechanism of claim 15, wherein said housing includes an indicator bar adapted to cooperate with said position indicator to provide a visual indication of the rotation of said cap.

17. The mechanism of claim 16, wherein said indicator bar is removably attachable to said housing.

18. An apparatus for treatment of water and indicating useful life, comprising:

a water treatment unit having a first chamber therein; and a useful life indicator, said indicator including (a) a housing having a second chamber therein attachable to the water treatment unit, said second chamber being arranged to be pressurized by the ingress of water into said first chamber and depressurized by the egress of water out of said first chamber, (b) a diaphragm disposed within said second chamber, said diaphragm being arranged to be moved by the pressurizing and depressurizing of said second chamber, (c) a regulating member adapted to cooperate with said diaphragm, (d) a plurality of interconnecting gears, said gears including a first gear and a last gear, (e) an escapement gear arranged to cooperate with said last gear and said regulating member, (f) a rotatable cap adapted to cooperate with said first gear, and (g) a spring attachable to said cap, said spring being arranged to provide mechanical rotation of said cap.

19. The apparatus of claim 18, wherein said cap includes a position indicator.

20. The apparatus of claim 19, wherein said housing includes an indicator bar adapted to cooperate with said position indicator to provide a visual indication of the rotational displacement of said cap.

21. The apparatus of claim 20, wherein said indicator bar is removably attachable to said housing.

22. The apparatus of claim 18, wherein said useful life indicator includes pressure regulating means for regulating air pressure within said water treatment unit.

23. The apparatus of claim 18, wherein said useful life indicator includes ventilation means for venting air from said indicator, said ventilation means being adapted to cooperate with said water treatment unit to release air therefrom.

* * * * *